United States Patent
Park et al.

(10) Patent No.: US 11,533,172 B2
(45) Date of Patent: Dec. 20, 2022

(54) APPARATUS AND METHOD FOR SECURELY MANAGING KEYS

(71) Applicant: SAMSUNG ELECTRONICS CO., LTD., Suwon-si (KR)

(72) Inventors: Keunyoung Park, Seongnam-si (KR); Dongjin Park, Seoul (KR); Jungtae Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 141 days.

(21) Appl. No.: 16/929,917

(22) Filed: Jul. 15, 2020

(65) Prior Publication Data

US 2021/0211281 A1    Jul. 8, 2021

(30) Foreign Application Priority Data

Jan. 8, 2020 (KR) .................. 10-2020-0002692

(51) Int. Cl.
*H04L 9/08* (2006.01)
*H04L 9/32* (2006.01)

(52) U.S. Cl.
CPC .......... *H04L 9/0866* (2013.01); *H04L 9/0836* (2013.01); *H04L 9/3236* (2013.01); *H04L 9/3247* (2013.01)

(58) Field of Classification Search
CPC ... H04L 9/0866; H04L 9/0836; H04L 9/3236; H04L 9/3247
See application file for complete search history.

(56) References Cited

U.S. PATENT DOCUMENTS

| | | | |
|---|---|---|---|
| 9,008,304 B2 | 4/2015 | Epp et al. | |
| 9,621,342 B2 | 4/2017 | Jakobsson et al. | |
| 9,686,077 B2 | 6/2017 | Raj et al. | |
| 9,978,117 B2* | 5/2018 | Koike | G06T 1/60 |
| 10,776,522 B1* | 9/2020 | McNeil | H04L 9/3247 |
| 11,055,105 B2* | 7/2021 | Duval | G06F 9/4406 |
| 2015/0195258 A1* | 7/2015 | Kohiyama | G06F 21/606 |
| | | | 713/168 |
| 2015/0365231 A1 | 12/2015 | Warnez et al. | |

(Continued)

FOREIGN PATENT DOCUMENTS

| | | |
|---|---|---|
| JP | 6357091 B2 | 7/2018 |
| KR | 101508439 B1 | 4/2015 |
| KR | 1020160058375 A | 5/2016 |

OTHER PUBLICATIONS

U.S. Appl. No. 17/018,237, filed Sep. 11, 2020 in the USPTO, "Apparatus and method for authentication of software.".

*Primary Examiner* — Brandon Hoffman
*Assistant Examiner* — Mayasa A. Shaawat
(74) *Attorney, Agent, or Firm* — Sughrue Mion, PLLC

(57) ABSTRACT

An integrated circuit includes a system memory, a security processor and a non-security processor. An attack against the integrated circuit is made more difficult based on using a key generated by the security processor. The security processor, as an example, reads a program image from the system memory and generates the key based on the program image. In some instances, a dedicated communication channel is provided for communication between the non-security processor and the security processor. The dedicated channel may be used to provide the key to the non-security processor for performance of a security operation.

24 Claims, 15 Drawing Sheets

(56) References Cited

U.S. PATENT DOCUMENTS

| | | |
|---|---|---|
| 2018/0081827 A1 | 3/2018 | Admon et al. |
| 2019/0289154 A1* | 9/2019 | Konosu .............. H04N 1/00896 |
| 2020/0319876 A1* | 10/2020 | Colombo ................ G06F 12/10 |
| 2021/0209219 A1 | 7/2021 | Park |

* cited by examiner

APPARATUS AND METHOD FOR SECURELY MANAGING KEYS

CROSS-REFERENCE TO RELATED APPLICATION

This application claims the benefit of Korean Patent Application No. 10-2020-0002692, filed on Jan. 8, 2020, in the Korean Intellectual Property Office, the disclosure of which is incorporated herein in its entirety by reference.

BACKGROUND

Embodiments disclosed herein relate to data security, and more particularly, to an apparatus and a method for securely managing keys used for data security.

In data security for protecting data, both software and hardware may be used together to protect data from advanced external attacks. In data security, keys may be used to encrypt or decrypt data, and thus, it may not be easy to decrypt data by using a key different from a valid key, that is, a key different from a key used for data encryption. Therefore, there is a need in data security to securely manage keys against external attacks.

SUMMARY

This application provides an apparatus and a method for securely managing keys used for data security from external attacks by using a security processor.

Provided herein is an integrated circuit including a first processor configured to execute a first program image to perform a security operation, the first program image being stored in a system memory; a second processor configured to: read at least a portion of a second program image, the second program image being stored in the system memory, and generate a key based on the at least the portion of the second program image; and a dedicated communication channel for communication between the first processor and the second processor, wherein the first processor is further configured to receive the key through the dedicated communication channel, and perform the security operation based on the key.

Also provided herein is a system including: an integrated circuit including a first processor and a second processor, wherein the first processor and the second processor are configured to communicate with each other through a dedicated communication channel; a system memory configured to store a program image executable by the first processor; and a non-volatile memory, wherein the non-volatile memory is exclusively accessible by the second processor and is configured to store loading information of the program image, wherein the second processor is further configured to: read, based on the loading information, at least a portion of the program image from the system memory; generate a key based on the at least the portion of the program image, and provide the key to the first processor, and the first processor is further configured to perform a security operation based on the key.

Provided herein is a method performed by an integrated circuit including a first processor and a second processor, the method including: reading, by the second processor, at least a portion of a program image from a system memory, the program image being executable by the first processor; generating, by the second processor, a key based on the at least the portion of the program image; and performing, by the first processor, a security operation based on the key.

BRIEF DESCRIPTION OF THE DRAWINGS

Embodiments of the disclosure will be more clearly understood from the following detailed description taken in conjunction with the accompanying drawings in which.

DETAILED DESCRIPTION OF THE EMBODIMENTS

Figure 1:
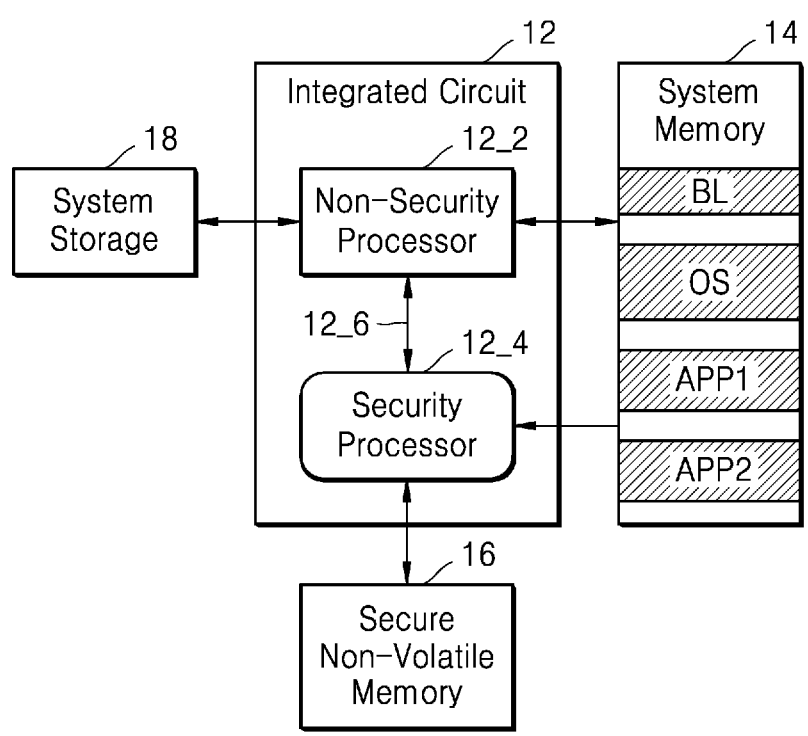
FIG. 1 is a block diagram illustrating an example of a system according to an example embodiment.

FIG. 1 is a block diagram illustrating an example of a system according to an example embodiment, In some embodiments, a system 10 may include, but is not limited to, a stationary computing system or a sub-system thereof, such as a server, a desktop computer, or a kiosk. In some embodiments, the system 10 may include, but is not limited to, a portable computing system or a sub-system thereof, such as a mobile phone, a wearable device, or a laptop computer. In some embodiments, the system 10 may include, but is not limited to, a sub-system included in a system, such as a household appliance, an industrial apparatus, or a vehicle, which is different from a stand-alone computing system. As shown in FIG. 1, the system 10 may include an integrated circuit 12, a system memory 14, a secure non-volatile memory 16, and system storage 18.

The integrated circuit 12 may include a non-security processor 12_2 and a security processor 12_4. Herein, the non-security processor 12_2 may be referred to as a first processor, and the security processor 12_4 may be referred to as a second processor. The integrated circuit 12 may be manufactured by a semiconductor process and, in some embodiments, the non-security processor 12_2 and the security processor 12_4 may be integrated into a single chip or die. In some embodiments, the integrated circuit 12 may be included in the same package as that of at least one of the other components, that is, the system memory 14, the secure non-volatile memory 16, and the system storage 18, of the system 10. In addition, in some embodiments, the integrated circuit 12 may be mounted on a board and may communicate with at least one of the other components, that is, the system memory 14, the secure non-volatile memory 16, and the system storage 18, which are mounted on the board, through patterns formed on the board.

The non-security processor 12_2 may communicate with the system memory 14 and may execute a program image, that is, a series of instructions included in the program image stored in the system memory 14. For example, the integrated circuit 12 may include a component (for example, 122_5 and/or 122_4 in FIG. 12) providing access to the system memory 14, and the non-security processor 12_2 may include at least one core capable of executing the instructions. Herein, a statement that the non-security processor 12_2 performs an operation by executing the instructions included in the program image may be simply expressed as a statement that the non-security processor 12_2 or the program image performs the operation. The security operation may be, for example, data encryption for confidentiality or generation of a signature for data integrity.

The security processor 12_4, together with the non-security processor 12_2, may be included, for data security, in the integrated circuit 12. The system 10 may process security-required data for various purposes. For example, the system 10 may securely process unique information related to a user of the system 10 and may securely process unique information related to a manufacturer or a valid supplier of the system 10. Security-required data may be encrypted by using a key, and the encrypted data may be decrypted by using the key and used, and then, may be encrypted again. Data may be encrypted and decrypted based on any cryptographic algorithm. In some embodiments, data may be encrypted and decrypted by a symmetric key cryptographic algorithm, such as Data Encryption Standard (DES) or Advanced Encryption Standard (AES), or a public key cryptographic algorithm, such as Rivest-Shamir-Adleman (RSA) or an elliptic curve technique.

To enhance security for security-required data and/or for a key (or a secret key) used for a cryptographic algorithm, the security processor 12_4 may be formed in a region physically isolated from the other components, for example, the non-security processor 12_2, of the integrated circuit 12. The security processor 12_4 may include components not capable of being accessed by the other components of the integrated circuit 12 and may independently perform an operation. For example, a security program (or security software) executed by the non-security processor 12_2 may also be limited in accessing the components included in the security processor 12_4. Accordingly, the security processor 12_4 may significantly improve a security level of the system 10. As shown in FIG. 1, the security processor 12_4 may communicate with the non-security processor 12_2 through a dedicated physical bus 12_6 as the dedicated communication channel and may exclusively access the secure non-volatile memory 16. In some embodiments, exclusive access indicates that the non-security processor 12_2 is unable to directly access data in the secure non-volatile memory 16. In addition, as shown in FIG. 1, the security processor 12_4 may read data, for example, a program image, stored in the system memory 14. In some embodiments, similarly to the non-security processor 12_2, the security processor 12_4 may include at least one core capable of executing a series of instructions. An example of the security processor 12_4 will be described below with reference to FIG. 3.

The security processor 12_4 may generate a key, which is used by a program image executed by the non-security processor 12_2, and may provide the key to the non-security processor 12_2. For example, the security processor 12_4 may generate a key, which is used to encrypt or decrypt user identification information for identifying a user of the system 10, and may provide the key to the non-security processor 12_2. In addition, the security processor 12_4 may generate a key, which is used to encrypt or decrypt user identification information for a software update of the system 10, and may provide the key to the non-security processor 12_2. Herein, an operation of using a key for data security may be referred to as a security operation, and a program image executed by the non-security processor 12_2 to perform the security operation may be referred to as a security program, a security application, or security software.

The security processor 12_4 may perform binding of the key provided to the non-security processor 12_2. The term "binding" used herein may refer to causing the key to be dependent upon a particular condition, that is, binding information, and keys generated based on different pieces of binding information may be different from each other. Accordingly, a key generated to be dependent upon unique binding information may enhance data security. When a key is generated based on, as the binding information, information (for example, $KEY_{HW}$ in FIG. 9) unique to the system 10 or the integrated circuit 12, although data encrypted by the system 10 is prevented from being decrypted by another system, there may be a risk in that the bound key is reused by a hacking program running on the system 10. Accordingly, the binding information may be required to include information unique to the security program executed by an entity making use of the key, that is, by the non-security processor 12_2.

As described below with reference to figures, the security processor 12_4 may read at least a portion of a program image from the system memory 14 and may generate a key based on the at least the read portion of the program image. That is, the security processor 12_4 may directly generate the binding information, based on the at least the portion of the program image stored in the system memory 14. Accordingly, while the non-security processor 12_2 obtains or generates the binding information, or while the non-security processor 12_2 provides the binding information to the security processor 12_4, a risk of exposure of the binding information may be removed. In addition, when at least a portion of the program image is changed by an improper attempt such as a hacking program, the security processor 12_4 may generate modified binding information, and thus, a different key may be generated, whereby data security may be maintained.

The system memory 14 may store at least one program image that may be executed by the non-security processor 12_2. In some embodiments, the system memory 14 may include, but is not limited to, a volatile memory device such as dynamic random access memory (DRAM) or static random access memory (SRAM). In some embodiments, the system memory 14 may include, but is not limited to, a non-volatile memory device such as flash memory, electrically erasable programmable read-only memory (EEPROM), silicon-oxide-nitride-oxide-silicon (SONOS) memory, polymer memory, magnetic random access memory (MRAM), phase-change random access memory (PRAM), or resistive random access memory (RRAM).

The program image may include a series of instructions executable by the non-security processor 12_2. For example, as shown in FIG. 1, the system memory 14 may store, as the program image, a bootloader BL, an operating system OS, applications APP1 and APP2, and the like. The bootloader BL may be executed by the non-security processor 12_2, thereby loading the program image (for example, OS), which is to be subsequently executed, into the system memory 14. The operating system OS may provide drivers of hardware included in the system 10 and may perform management, for example, installation, deletion, or scheduling, of the applications APP1 and APP2. The program image may also be referred to as a software image, a binary image, or a binary program image, and example structures of the program image will be described below with reference to FIG. 4.

The secure non-volatile memory 16 may be exclusively accessed by the security processor 12_4, and the secure non-volatile memory 16 and the security processor 12_4 may communicate with each other through a secure channel. In some embodiments, the security processor 12_4 may write data encrypted inside thereof to the secure non-volatile memory 16 and may decrypt data read from the secure non-volatile memory 16. In some embodiments, the secure non-volatile memory 16 may store the program image executed by the security processor 12_4. In some embodiments, the secure non-volatile memory 16 may store information required for the security processor 12_4 to generate a key. The secure non-volatile memory 16 may include at least one non-volatile memory device, and an example of the secure non-volatile memory 16 will be described below with reference to FIG. 5A.

The system storage 18 may not lose data stored therein even when power supplied thereto is interrupted. For example, the system storage 18 may include a non-volatile memory device and may also include a storage medium such as tape, a magnetic disk, or an optical disk. The system storage 18 may communicate with the non-security processor 12_2, and the integrated circuit 12 may include a component (for example, 122_6 in FIG. 12) providing access to the system storage 18. For example, the non-security processor 12_2 may process data stored in the system storage 18, may store data in the system storage 18, and may load a program image stored in the system storage 18 into the system memory 14.

Figure 2:
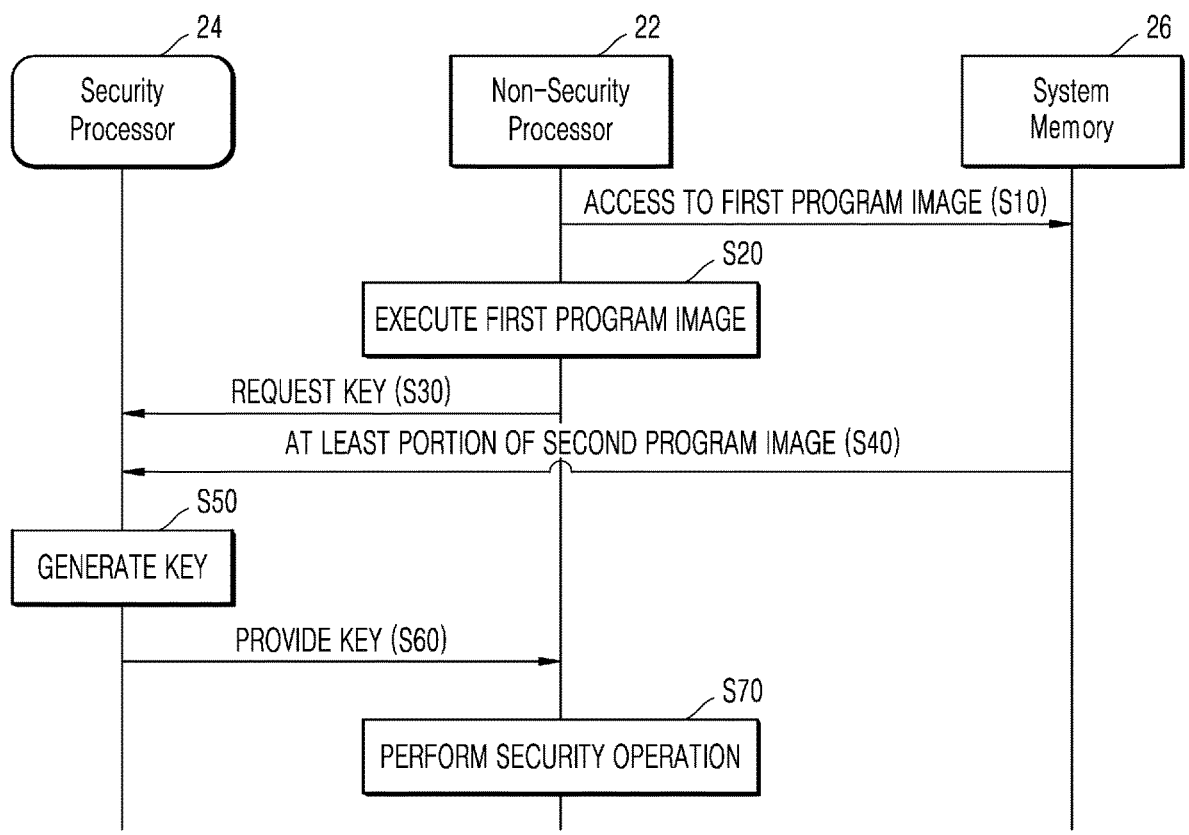
FIG. 2 is a diagram illustrating an example of a method of securely managing a key, according to an example embodiment.

FIG. 2 is a diagram illustrating an example of a method of securely managing a key, according to an example embodiment. Specifically, FIG. 2 illustrates operations of both a non-security processor 22 and a security processor 24 with the passing of time.

In operation S10, the non-security processor 22 may access a first program image. For example, the non-security processor 22 may access a system memory 26 storing the first program image and may copy at least some of instructions included in the first program image to a memory, for example, a cache, included in the non-security processor 22. The first program image may be a program image, which is executed by the non-security processor 22 and thus performs a security operation using a key for data security, and may be referred to as a security program, a security application, or security software.

In operation S20, the non-security processor 22 may execute the first program image. For example, the non-security processor 22 may execute a series of instructions copied to the cache, and thus, the execution of the first program image may be started.

In operation S30, the non-security processor 22 may request a key from the security processor 24. For example, the non-security processor 22 may require the key for encryption, decryption, and/or the like of data during the execution of the first program image, and thus, may request the key from the security processor 24 through a dedicated physical bus or mailbox (for example, 12_6 in FIG. 1). A mailbox may be implemented as a shared register with a first control flag set by a first chip or logic indicating that the first chip has written new data to be read by a second chip or second logic. The second chip may periodically poll the first control flag, discover the control flag is asserted, read the register, and clear the control flag. A second register may be provided in the other direction for the second chip to act as the writer and the first chip to poll a second control flag, etc. In some embodiments, the request provided from the non-security processor 22 to the security processor 24 may include an identifier of a second program image, which is to be read from the system memory 26 by the security processor 24 in subsequent operation S40, and based on the identifier of the second program image, the security processor 24 may obtain loading information regarding a region of the system memory 26, into which the second program image is loaded. In addition, in some embodiments, the request provided from the non-security processor 22 to the security processor 24 may include a key identifier (for example, $ID_{KEY}$ in FIG. 9). For example, the first program image may use a plurality of keys, and thus, to distinguish the plurality of keys, the non-security processor 22 may cause the key identifier to be included in the request, and the security processor 24 may generate a key that is dependent upon the key identifier.

In operation S40, the security processor 24 may read at least a portion of the second program image from the system memory 26. For example, the security processor 24 may obtain the loading information of the second program image in response to the request of the non-security processor 22 and may read the at least the portion of the second program image by accessing the system memory 26 based on the loading information. The second program image may be same with a program image having requested the key, that is, the first program image, in some embodiments, and may also be different from the first program image in some embodiments. Examples of operation S40 will be described below with reference to FIGS. 6A and 6B.

In operation S50, the security processor 24 may generate the key. For example, the security processor 24 may generate the key based on the at least the portion of the second program image, which is read from the system memory 26. In some embodiments, the security processor 24 may implement a key derivation function (KDF) and may generate the key by inputting, to the KDF, binding information generated from the at least the portion of the second program image. In some embodiments, the security processor 24 may input, to the KDF, additional information as well as the binding information generated based on the at least the portion of the second program image. For example, the security processor 24 may input, to the KDF, at least one of a hardware key (for example, $KEY_{HW}$ in FIG. 9) unique to the security processor 24, a key identifier (for example, $ID_{KEY}$ in FIG. 9), and the identifier of the second program image. In some embodiments, the security processor 24 may also generate the key by encrypting a key that is output by the KDF. Examples of operation S50 will be described below with reference to FIGS. 7A and 7B.

In operation S60, the security processor 24 may provide the key to the non-security processor 22. For example, the security processor 24 may provide the key to the non-security processor 22 through a dedicated physical bus or mailbox (for example, 12_6 in FIG. 1). Next, in operation S70, the non-security processor 22 may perform a security operation by using the key. For example, the non-security processor 22 may encrypt or decrypt data by using the key.

As described above, the security processor 24 may generate the key that is dependent upon the at least the portion of the second program image, which is read directly from the system memory 26 by the security processor 24. Accordingly, when the at least the portion of the second program image is modified, a key different from the key generated based on the original second program image may be generated, and data encrypted by the original key may not be normally decrypted by the key generated based on the modified second program image.

Figure 3:
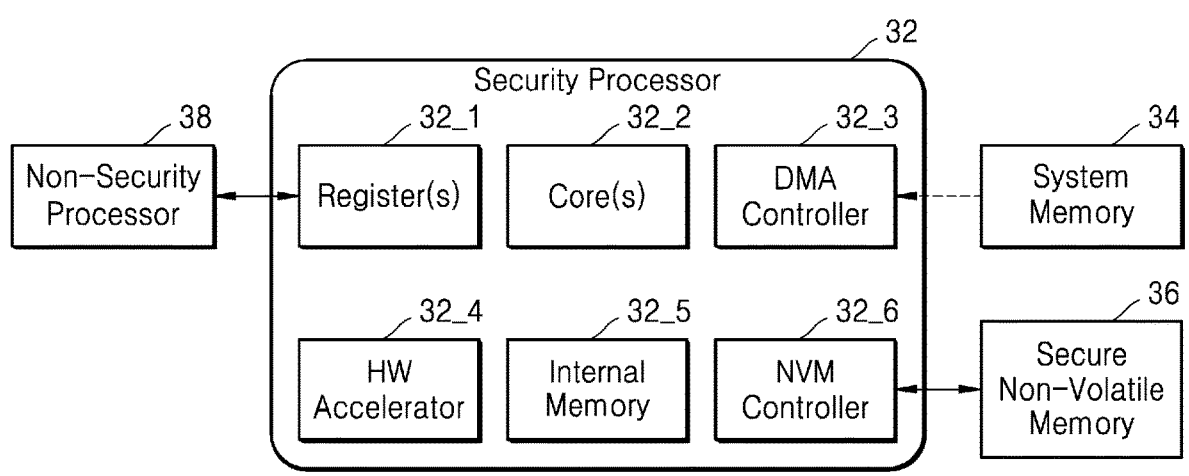
FIG. 3 is a block diagram illustrating an example of a security processor according to an example embodiment.

FIG. 3 is a block diagram illustrating an example of a security processor according to an example embodiment. Specifically, the block diagram of FIG. 3 illustrates a system memory 34, a secure non-volatile memory 36, and a non-security processor 38, together with a security processor 32. As described above with reference to FIG. 1, the security processor 32 and the non-security processor 38 may be included in a single integrated circuit. In the following descriptions regarding FIG. 3, repeated descriptions given with reference to FIG. 1 will be omitted.

Referring to FIG. 3, the security processor 32 may include at least one register 32_1, at least one core 32_2, a direct memory access (DMA) controller 32_3, a hardware accelerator 32_4, an internal memory 32_5, and a non-volatile memory controller 32_6. In some embodiments, the security processor 32 may include a bus connected to the at least one register 32_1, the at least one core 32_2, the DMA controller 32_3, the hardware accelerator 32_4, the internal memory 32_5, and the non-volatile memory controller 32_6. In some embodiments, the security processor 32 may further include a random number generator for generating a key pair or the like, a component providing a hardware key (for example, $KEY_{HW}$ in FIG. 9), or the like. As shown in FIG. 3, the security processor 32 may include dedicated components for performing an operation independently of the other components, for example, the non-security processor 38, of the integrated circuit. Herein, an operation performed by each of the components included in the security processor 32 may be referred to as being performed by the security processor 32.

The at least one register 32_1 may be accessed by the non-security processor 38. For example, the security processor 32 may receive a request for a key from the non-security processor 38 via the at least one register 32_1. In addition, the security processor 32 may store a generated key in the at least one register 32_1, thereby providing the key to the non-security processor 38. In some embodiments, the at least one register 32_1 may be referred to as a mailbox or mailbox hardware. In addition, the at least one register 32_1 may also be referred to as being included in a dedicated physical bus for communication with the non-security processor 38.

The at least one core 32_2 may refer to any processing element configured to execute instructions. For example, the at least one core 32_2 may perform at least a portion of an operation of generating a key by executing a series of instructions stored in the internal memory 32_5. Herein, a program image including instructions, which are executed by the at least one core 32_2 included in the security processor 32, may be referred to as security firmware or a security firmware image.

The DMA controller 32_3 may provide direct memory access (DMA) to the system memory 34. At least a portion of a program image (for example, the second program image in FIG. 2) stored in the system memory 34 may be read by the DMA controller 32_3. In some embodiment, the DMA controller 32_3 may read the program image via a system memory controller (for example, 122_5 in FIG. 12) included in the integrated circuit. In some embodiments, the DMA controller 32_3 may be configured to perform only an operation of reading the system memory 34 and may not support an operation of writing data to the system memory 34.

The hardware accelerator 32_4 may refer to a hardware designed to perform a pre-defined operation at a high speed and may perform at least a portion of an operation of generating a key. In some embodiments, the hardware accelerator 32_4 may include a crypto engine. For example, the crypto engine may implement a hash function for generating a hash for the at least the portion of the program image, which is read from the system memory 34, may perform encryption and/or decryption of data, and may verify a digital signature of the program image, which is described below.

The internal memory 32_5 may store data required for an operation of the security processor 32. In some embodiments, the internal memory 32_5 may include ROM storing instructions that may be executed by the at least one core 32_2. In addition, in some embodiments, the internal memory 32_5 may include RAM which has a secure firmware image loaded therein or stores data processed by the least one core 32_2. Further, the internal memory 32_5 may store the at least the portion of the program image, which is read by the DMA controller 32_3, and may also store data provided to the hardware accelerator 32_4 or processed by the hardware accelerator 32_4.

The non-volatile memory controller 32_6 may provide access to the secure non-volatile memory 36. For example, the secure non-volatile memory 36 may include a flash memory device, and the non-volatile memory controller 32_6 may include a flash controller providing a flash memory interface. In addition, the secure non-volatile memory 36 may support a serial interface, and the non-volatile memory controller 32_6 may include, for example, a controller providing a universal serial interface (USI) such as Inter-Integrated Circuit (I2C) or Serial Peripheral Interface (SPI). As described above with reference to FIG. 1, the non-volatile memory controller 32_6 and the secure non-volatile memory 36 may communicate with each other through a secure channel.

Figure 4:
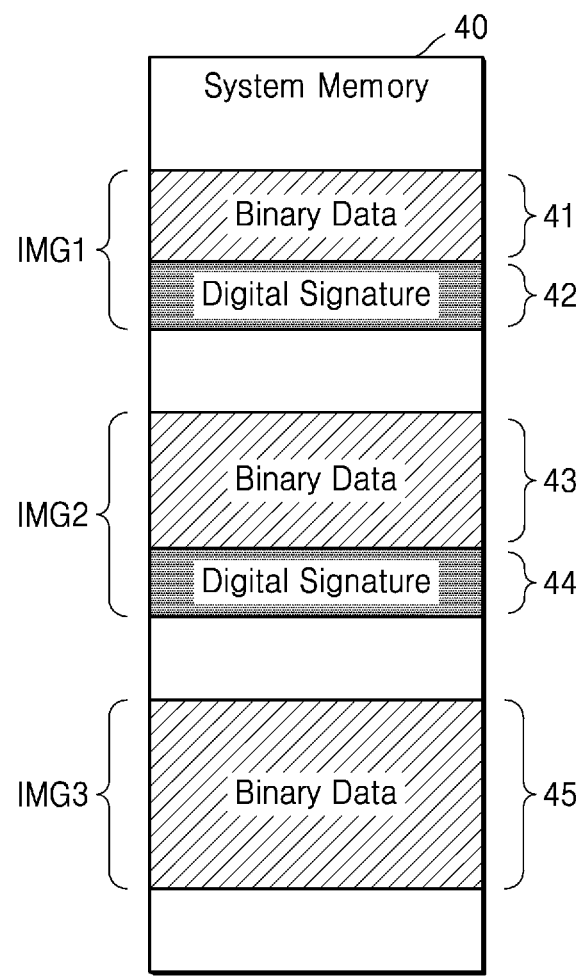
FIG. 4 illustrates an example of a system memory storing a program image, according to an example embodiment.

FIG. 4 illustrates an example of a system memory storing a program image, according to an example embodiment. As shown in FIG. 4, a system memory 40 may store a first program image IMG1, a second program image IMG2, and a third program image IMG3. System memory 40 of FIG. 4, in some embodiments, is an example of system memory 14 of FIG. 1. In some embodiments, a program image is a number of bits of information at a specific portion of memory. For example, a program image in some embodiments is a number of consecutive bytes or words in the system memory 40. The program images stored in the system memory 40 may dynamically vary, and FIG. 4 illustrates a state of the system memory 40 at a particular time point. For example, the system memory 40 may simultaneously store three or more program images, and at least some of the first program image IMG1, the second program image IMG2, and the third program image IMG3 may be invalidated from the system memory 40 by loading of a new program image. Hereinafter, descriptions regarding FIG. 4 will be made with reference to FIG. 1.

A program image may include binary data. For example, as shown in FIG. 4, the first program image IMG1 and the second program image IMG2 may respectively include pieces of binary data 41 and 43, and the third program image IMG3 may include only binary data 45. The binary data may include instructions executed by the non-security processor 12_2 and may be generated, for example, by compiling a source code written in a programming language. In some embodiments, the binary data may also include data referenced by the instructions, as well as the instruction. The binary data may also be referred to as a binary image, a binary code, or a binary code image.

In some embodiments, the program image may include a digital signature. For example, as shown in FIG. 4, the first program image IMG1 and the second program image IMG2 may respectively include digital signatures 42 and 44. A digital signature (or an electronic signature) may be used to determine the authenticity of the program image, that is, that the program image is generated by an authenticated entity. For example, the digital signature 42 may be used to determine the authenticity of the first program image IMG1, and the digital signature 44 may be used to determine the authenticity of the second program image IMG2. The digital signature and verification information may be generated as digests generated from a common source, and the digital signature may be verified by the verification information. For example, a key pair including a private key and a public key may be generated, and the digital signature may be generated from the private key and may be verified, based on a mathematical algorithm, by the public key as the verification information.

The security processor 12_4 may determine the authenticity of the program image by verifying the digital signature. For this purpose, the security processor 12_4 may obtain the verification information and may verify the digital signature based on the verification information. In some embodiments, during the process of manufacturing the integrated circuit 12 and/or the system 10, the public key and/or a digest of the public key, as the verification information, may be provisioned to the security processor 12_4, and the security processor 12_4 may verify the digital signature based on the provisioned public key and/or the provisioned digest of the public key. In addition, in some embodiments, the security processor 12_4 may also verify the digital signature, based on the public key and/or the digest of the public key included in a software image, which includes at least one key and is loaded into the system memory 40, such as a keychain image disclosed in Korean Patent Application No. 10-2020-0002691, entitled "APPARATUS AND METHOD FOR AUTHENTICATION OF SOFTWARE" and filed by the same applicants on the same date as that of the present application, in the Korean Intellectual Property Office, the disclosure of which is incorporated herein in its entirety by reference. The program image including the digital signature having passed the verification, that is, the authenticated program image may be reliable, and the non-security processor 12_2 may execute the authenticated program image.

In some embodiments, as described below with reference to FIG. 8 and the like, the security processor 12_4 may read the digital signature from the system memory 40 and may generate a key based on the digital signature. For example, the security processor 12_4 may generate the key based on the digital signature included in the program image having requested the key and may also generate the key based on the digital signature included in a program image that is different from the program image having requested the key.

In some embodiments, the program image may include the digital signature together with key information as information about the verification information used for the verification of the digital signature. For example, as disclosed in Korean Patent Application No. 10-2020-0002691, entitled "APPARATUS AND METHOD FOR AUTHENTICATION OF SOFTWARE", the digital signature of the program image may be verified by the public key included in the software image loaded into the system memory 40, as well as by the public key included in the security processor 12_4, and the key information may include information about the public key for the verification of the digital signature included in the program image which includes the digital signature together with the key information.

Figure 5A:
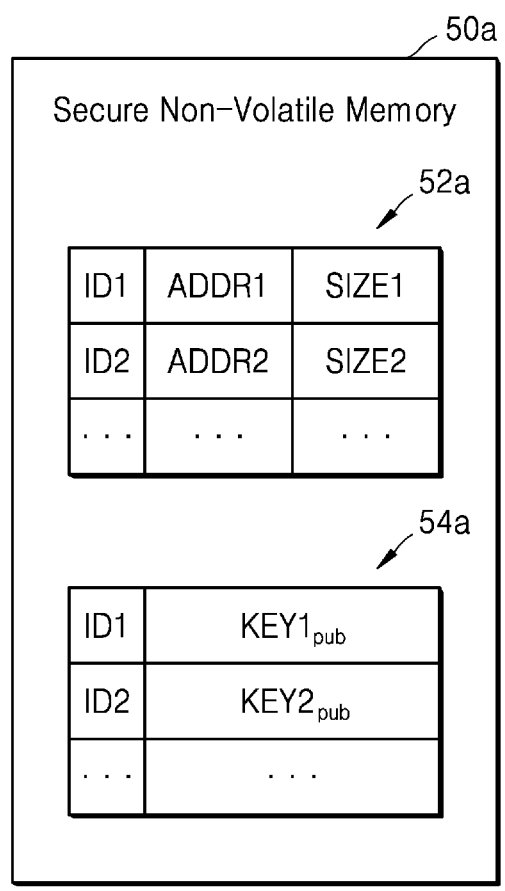
FIGS. 5A and 5B are diagrams respectively illustrating examples of information used for key generation, according to example embodiments.
Figure 5B:
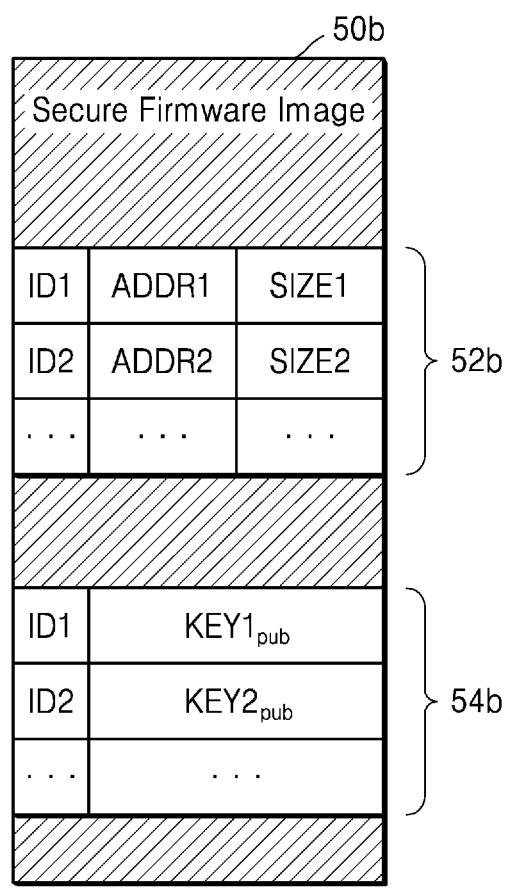

FIGS. 5A and 5B are diagrams respectively illustrating examples of information used for key generation, according to an example embodiment. Specifically, FIGS. 5A and 5B respectively illustrate examples of both loading information of a program image and verification information of a digital signature. In the following descriptions regarding FIGS. 5A and 5B, a reference of FIG. 1 will be made, and repeated descriptions will be omitted.

Referring to FIG. 5A, a secure non-volatile memory 50a may store loading information 52a of a program image and verification information 54a of a digital signature (the verification information may include a public key). In some embodiments, unlike the example shown in FIG. 5A, the secure non-volatile memory 50a may store only one of the loading information 52a and the verification information 54a.

The loading information 52a may include an identifier of the program image and both an address and a size corresponding thereto. For example, as shown in FIG. 5A, the loading information 52a may include an identifier ID1 of a first program image and both a first address ADDR1 and a first size SIZE1 corresponding thereto, and the first program image may be stored in a region starting from the first address ADDR1 and corresponding to the first size SIZE1, in the system memory 14. In some embodiments, ID1 is an example of an identifier of a program image. In some embodiments, the first size SIZE1 may be an address offset from the first address ADDR1 to an end address of the first program image. In some embodiments, the loading information 52a may include, instead of the first size SIZE1, the end address of the first program image. Similarly, the loading information 52a may include an identifier ID2 of a second program image and both a second address ADDR2 and a second size SIZE2 corresponding thereto. The security processor 12_4 may obtain, from the secure non-volatile memory 50a, an address and a size, both corresponding to the identifier of the program image provided from the non-security processor 12_2.

The verification information 54a may include the identifier of the program image and a public key corresponding thereto. For example, as shown in FIG. 5A, the verification information 54a may include the identifier ID1 of the first program image and a first public key $KEY1_{PUB}$ corresponding thereto, and the digital signature included in the first program image may be verified by the first public key $KEY1_{PUB}$. Similarly, the verification information 54a may include the identifier ID2 of the second program image and a second public key $KEY2_{PUB}$ corresponding thereto, and the digital signature included in the second program image may be verified by the second public key $KEY2_{PUB}$. The security processor 12_4 may be provided with the identifier of the program image from the non-security processor 12_2 and may obtain, from the secure non-volatile memory 50a, a public key corresponding to the provided identifier.

In some embodiments, the security processor 12_4 may obtain the loading information 52a and/or the verification information 54a from the non-security processor 12_2 and may write the loading information 52a and/or the verification information 54a to the secure non-volatile memory 50a. For example, the security processor 12_4 may write the loading information 52a and/or the verification information 54a to the secure non-volatile memory 50a, in response to initial settings included in the system 10 during the process of manufacturing the system 10. As another example, the security processor 12_4 may write the loading information 52a and/or the verification information 54a to the secure non-volatile memory 50a, in response to a master reset (or a factory reset) of the system 10. As another example, in response to installation of an application on an operating system, the security processor 12_4 may write, to the secure non-volatile memory 50a, the loading information 52a and/or the verification information 54a, both corresponding to a program image of the application. Accordingly, the secure non-volatile memory 50a may store a secure firmware image 50b including loading information 52b of the program image and verification information 54b of the digital signature.

Referring to FIG. 5B, the loading information 52b of the program image and the verification information 54b of the digital signature may be included in the secure firmware image 50b executed by the security processor 12_4. The secure firmware image 50b may be loaded into an internal memory (for example, 32_5 in FIG. 3) from the secure non-volatile memory 50a. In some embodiments, unlike the example shown in FIG. 5B, the secure firmware image 50b may include only one of the loading information 52b and the verification information 54b. The security processor 12_4 may be provided with the identifier of the program image from the non-security processor 12_2 and may obtain, from the secure firmware image 50b, an address and a size, both corresponding to the provided identifier. In addition, the security processor 12_4 may be provided with the identifier of the program image from the non-security processor 12_2 and may obtain, from the secure firmware image 50b, a public key corresponding to the provided identifier.

Figure 6A:
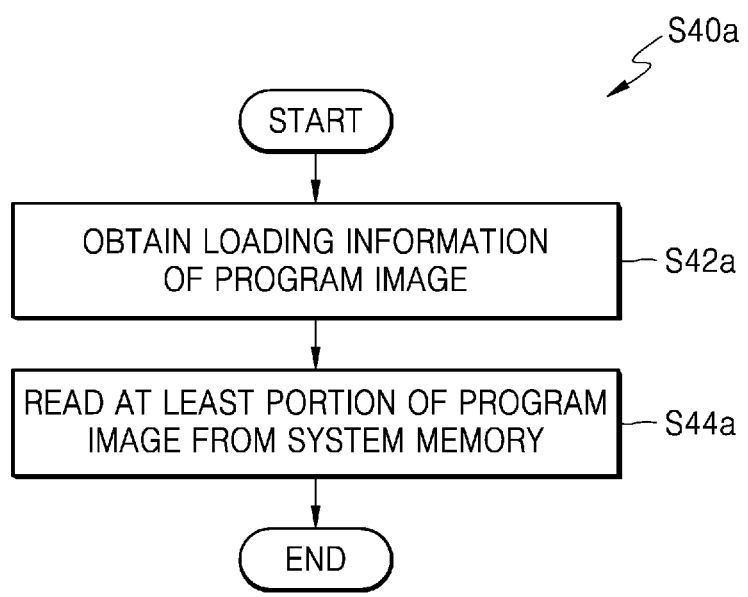
FIGS. 6A and 6B are flowcharts respectively illustrating examples of a method of securely managing a key, according to example embodiments.
Figure 6B:
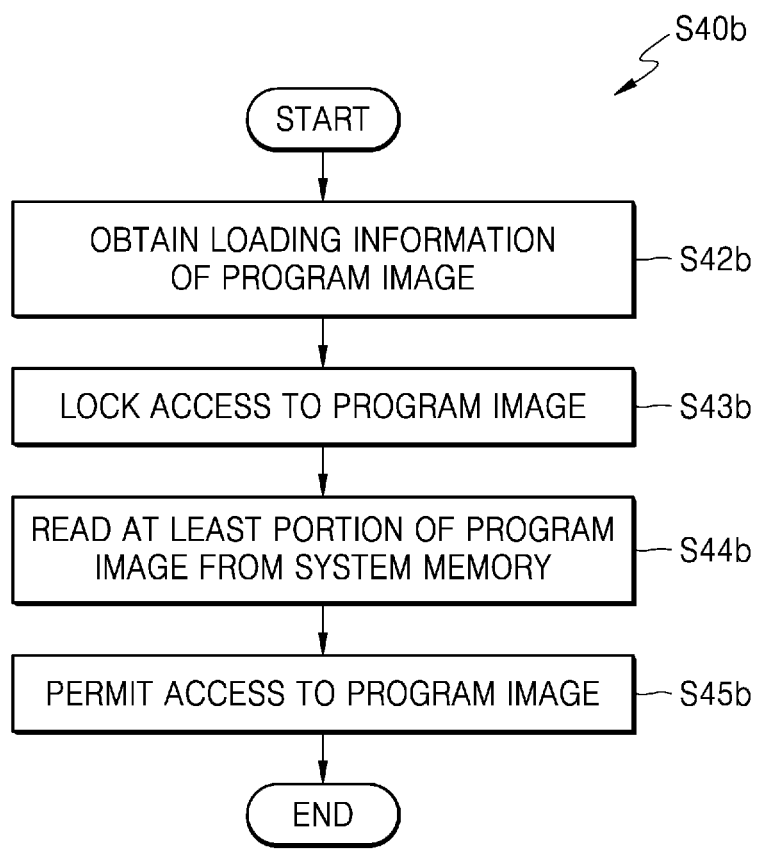

FIGS. 6A and 6B are flowcharts respectively illustrating examples of a method of securely managing a key, according to example embodiments. Specifically, the flowcharts of FIGS. 6A and 6B respectively illustrate examples of operation S40 of FIG. 2. As described above with reference to FIG. 2, in operation S40a of FIG. 6A and operation S40b of FIG. 6B, an operation of reading, by a security processor, at least a portion of a program image from a system memory may be performed. In some embodiments, operation S40a of FIG. 6A and operation S40b of FIG. 6B may be performed by the security processor 12_4 of FIG. 1 and, in the following descriptions regarding FIGS. 6A and 6B, a reference of FIG. 1 will be made and repeated descriptions will be omitted.

Referring to FIG. 6A, operation S40a may include operation S42a and operation S44a. In operation S42a, an operation of obtaining loading information of the program image may be performed. For example, the security processor 12_4 may obtain an identifier of the program image, which is to be read from the system memory 14, and may obtain the loading information, which corresponds to the obtained identifier, from the secure non-volatile memory 16 and/or a secure firmware image.

In operation S44a, an operation of reading at least a portion of the program image from the system memory 14 may be performed. For example, the security processor 12_4 may read the at least the portion of the program image from the system memory 14, based on the loading information obtained in operation S42a. In some embodiments, the security processor 12_4 may read the whole program image and may also read a portion of the program image. In addition, the security processor 12_4 may read a digital signature included in the program image.

Referring to FIG. 6B, similarly to operation S40a of FIG. 6A, operation S40b may include operation S42b and operation S44b, and operation S40b may further include operation S43b and operation S45b, which are performed respectively before and after operation S44b. In some embodiments, operation S43b may be performed before operation S42b is performed.

Figure 12:
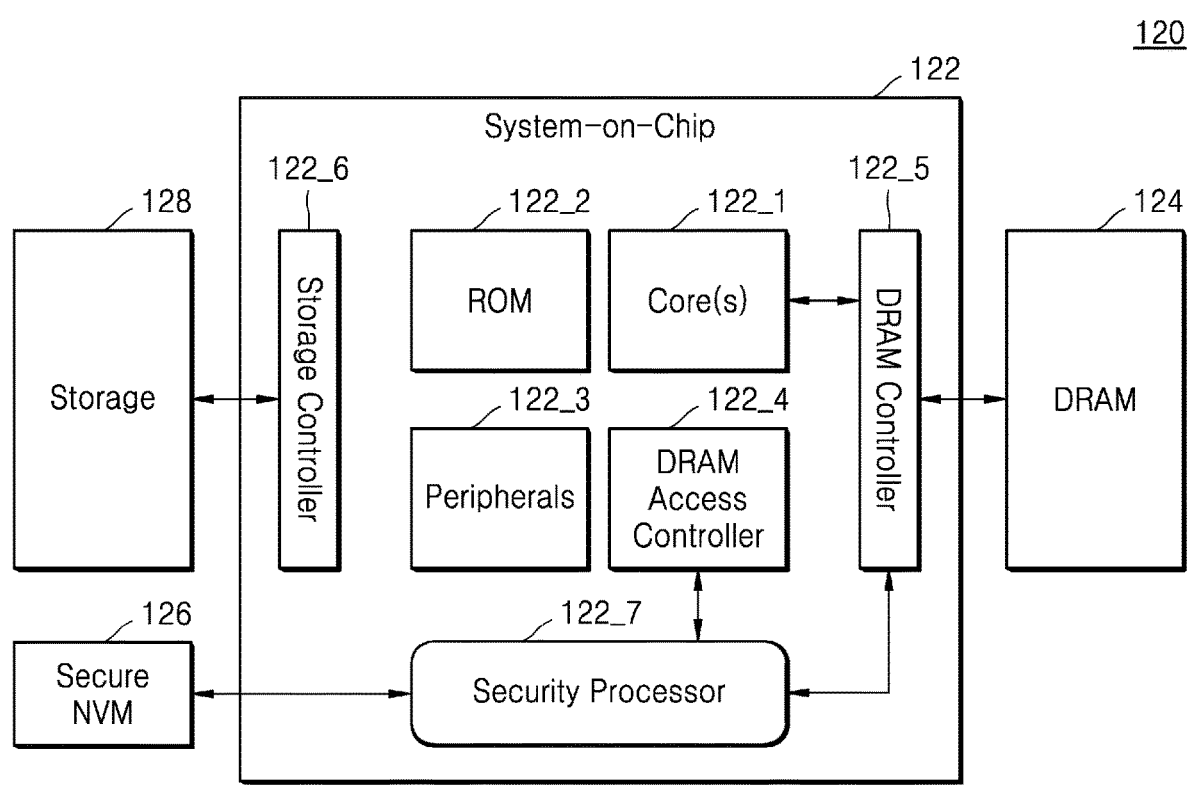
FIG. 12 is a block diagram illustrating an example of a system according to an example embodiment.

In operation S42b, an operation of obtaining loading information of the program image may be performed. Next, in operation S43b, an operation of locking access to the program image may be performed. For example, the security processor 12_4 may perform the operation of locking the access to the program image such that the program image is not changed while being read from the system memory 14. In some embodiments, the security processor 12_4 may block access, which is made by the non-security processor 12_2, to the system memory 14. Access to the system memory 14 by the security processor 12_4 and the non-security processor 12_2 may be coordinated by a memory access controller. In some embodiments, DRAM access controller 122_4 of FIG. 12 is an example of a memory access controller.

The blocking of memory access may be implemented by the security processor 12_4 in coordination with the memory access controller. In some embodiments, the security processor 12_4 may block the access, which is made by the non-security processor 12_2, to the program image that is to be read. For example, the security processor 12_4 may block access by setting a flag in or providing an instruction to the memory access controller. Next, in operation S45b, an operation of reading at least a portion of the program image from the system memory 14 may be performed.

In operation S45b, an operation of permitting the access to the program image may be performed. In some embodiments, the security processor 12_4 may unlock the access by the non-security processor 12_2 with respect to the system memory 14. In some embodiments, the security processor 12_4 may unlock the access, which made by the non-security processor 12_2, to the program image.

Figure 7A:
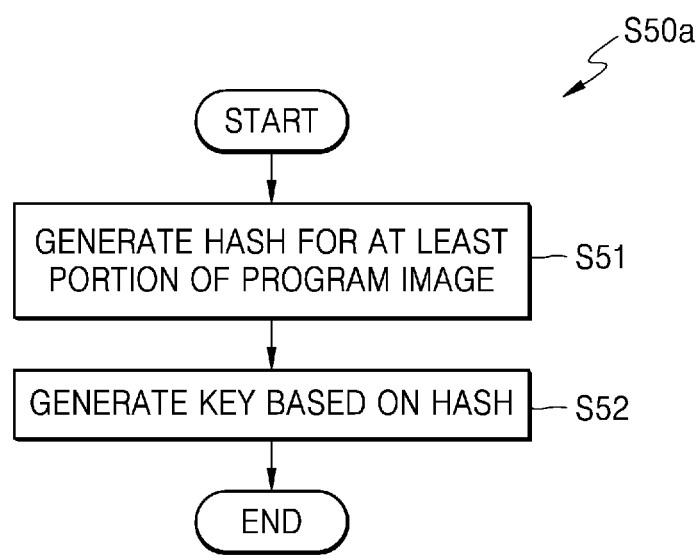
FIGS. 7A and 7B are flowcharts respectively illustrating examples of a method of securely managing a key, according to example embodiments.
Figure 7B:
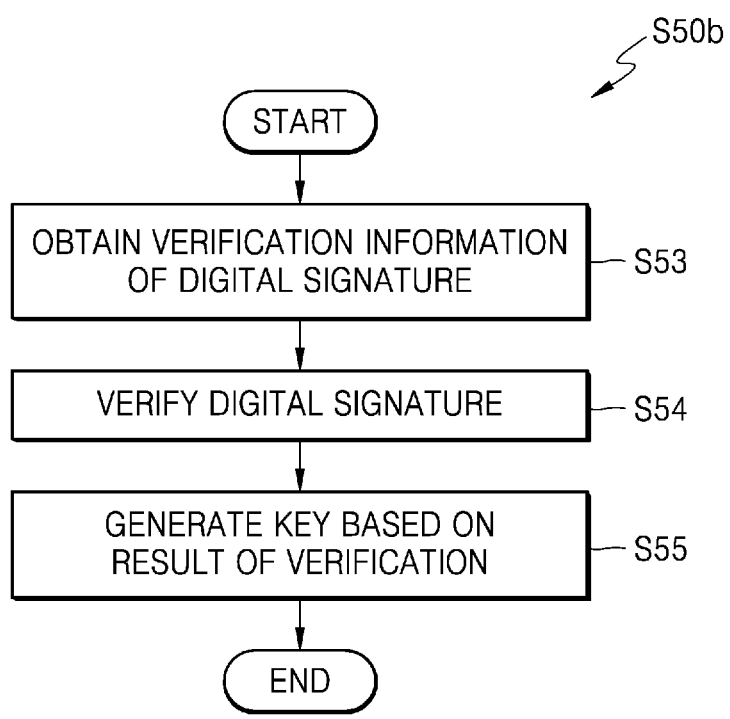

FIGS. 7A and 7B are flowcharts respectively illustrating examples of a method of securely managing a key, according to example embodiments. Specifically, the flowcharts of FIGS. 7A and 7B respectively illustrate examples of operation S50 of FIG. 2. In some embodiments, operation S50 of FIG. 2 may include both operation S50a of FIG. 7A and operation S50b of FIG. 7B. As described above with reference to FIG. 2, in operation S50a of FIG. 7A and operation S50b of FIG. 7B, an operation of generating a key may be performed. In some embodiments, operation S50a of FIG. 7A and operation S50b of FIG. 7B may be performed by the security processor 12_4 of FIG. 1 and, in the following descriptions regarding FIGS. 7A and 7B, a reference of FIG. 1 will be made and repeated descriptions will be omitted.

Referring to FIG. 7A, operation S50a may include operation S51 and operation S52. In operation S51, an operation of generating a hash for at least a portion of a program image may be performed. The hash is a result of a hash function and may be referred to as a hash value, a hash code, a hash checksum, or the like. The hash function may refer to a function for mapping data having any length to data having a fixed length. The security processor 12_4 may implement the hash function and may generate the hash for the at least the portion of the program image, which is read from the system memory 14. Accordingly, a hash for a changed program image may be different from the hash for the original program image.

In operation S52, an operation of generating a key based on the hash may be performed. For example, the security processor 12_4 may input the hash to a KDF. That is, the hash for the at least the portion of the program image may be used as binding information.

Referring to FIG. 7B, operation S50b may include a plurality of operations S53 to S55. In operation S53, an operation of obtaining verification information of a digital signature. For example, the security processor 12_4 may obtain the verification information from the secure non-volatile memory 50a as described above with reference to FIG. 5A, and may also obtain the verification information from the secure firmware image 50b as described above with reference to FIG. 5B.

In operation S54, an operation of verifying the digital signature may be performed. For example, the security processor 12_4 may obtain a public key as the verification information in operation S53 and may verify the digital signature by using the public key. Accordingly, the verification of the digital signature may succeed or fail according to the authenticity of the program image.

In operation S55, an operation of generating a key based on a result of the verification may be performed. For example, the security processor 12_4 may input the verification result in operation S54 to a KDF. Accordingly, the key generated in the case of success of the verification may be different from the key generated in the case of fail of the verification.

Figure 8:
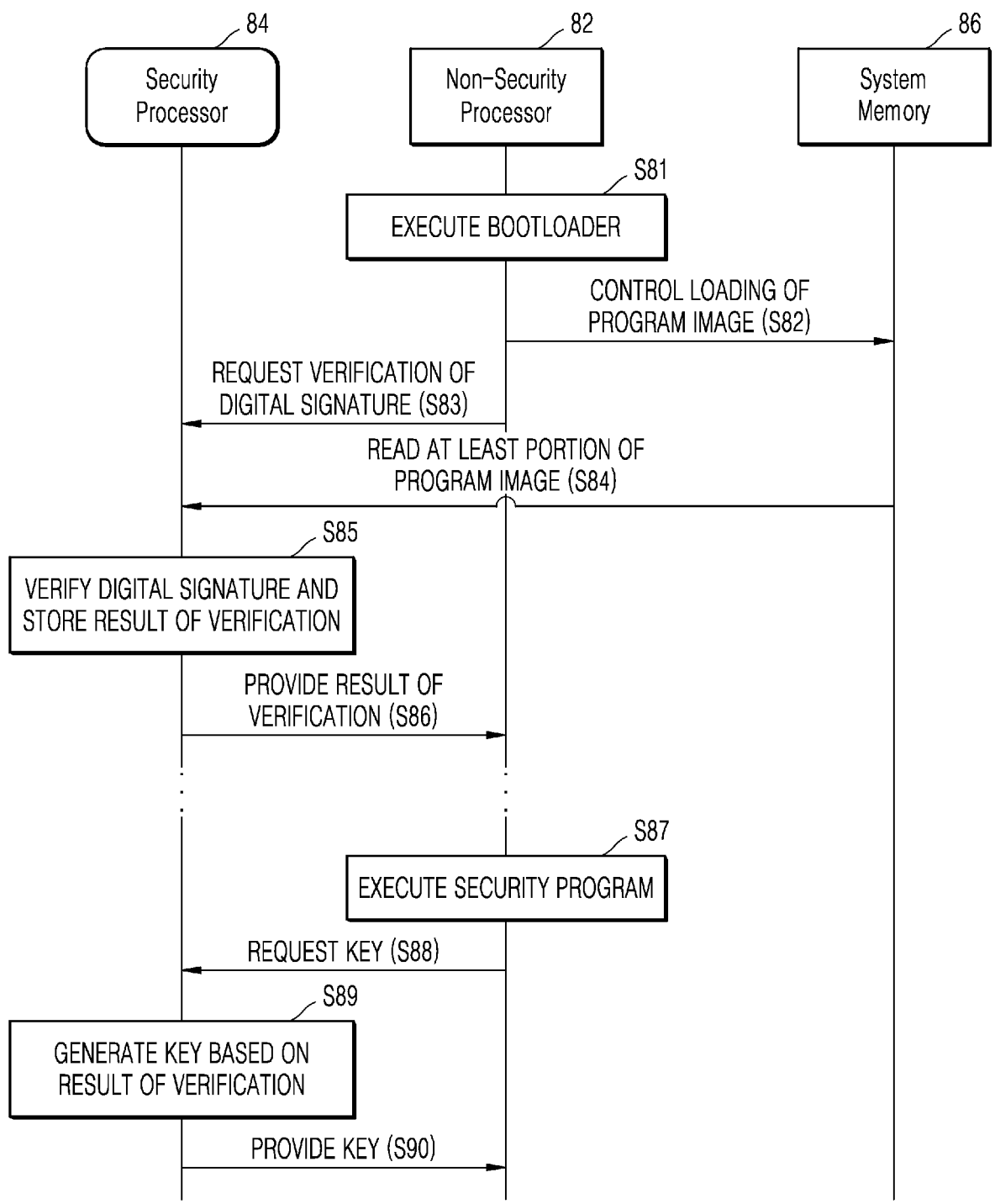
FIG. 8 is a diagram illustrating an example of a method of securely managing a key, according to an example embodiment.

FIG. 8 is a diagram illustrating an example of a method of securely managing a key, according to an example embodiment. Specifically, FIG. 8 illustrates operations of a non-security processor 82 and a security processor 84 with the passing of time. In some embodiments, the security processor 84 may use a verification result of a program image in generating a key that is requested by another program image, that is, a security program. In the following descriptions regarding FIG. 8, repeated descriptions given with reference to the above-described figures will be omitted.

In operation S81, the non-security processor 82 may execute a bootloader. The bootloader may be executed during the process of initialization of a system, such as the case where the system including the non-security processor 82, the security processor 84, and a system memory 86 is supplied with power or is reset. The bootloader may be stored in ROM (for example, 122_2 in FIG. 12) included in the non-security processor 82 in some embodiments and may be executed by the non-security processor 82 after loaded into the system memory 86. In operation S82, the non-security processor 82 may control loading of a program image. For example, the bootloader may be executed by the non-security processor 82, thereby loading at least one program image, for example, an operating system, a kernel, or the like, into the system memory 86. In operation S83, the non-security processor 82 may request the security processor 84 to verify a digital signature. The at least one program image loaded by the bootloader may include the digital signature, and the bootloader may be executed by the non-security processor 82, thereby requesting the verification of the digital signature that is included in the at least one program image loaded into the system memory 86.

In operation S84, the security processor 84 may read at least a portion of the program image from the system memory 86. For example, the security processor 84 may read the digital signature from the program image stored in the system memory 86. In operation S85, the security processor 84 may verify the digital signature and may store a result of the verification. For example, the security processor 84 may store the verification result of the digital signature in an internal memory (for example, 32_5 in FIG. 3). In operation S86, the security processor 84 may provide the verification result to the non-security processor 82.

In operation S87, the security processor 84 may execute a security program. For example, a program image of the security program may be loaded into the system memory 86, and the non-security processor 82 may start executing the loaded program image. In operation S88, the non-security processor 82 may request a key from the security processor 84. For example, the security program may be executed by the non-security processor 82, thereby requesting the key from the security processor 84.

In operation S89, the security processor 84 may generate the key based on the verification result of the digital signature. For example, the security processor 84 may input, to a KDF, the verification result generated in operation S85. Accordingly, the key may rely upon the verification result of the digital signature that is requested for verification by the bootloader. In some embodiments, the security processor 84 may generate the key, further based on the at least the portion of the program image of the security program, which is read from the system memory 86, as well as based on the verification result. In operation S90, the security processor 84 may provide the key to the non-security processor 82.

Figure 9:
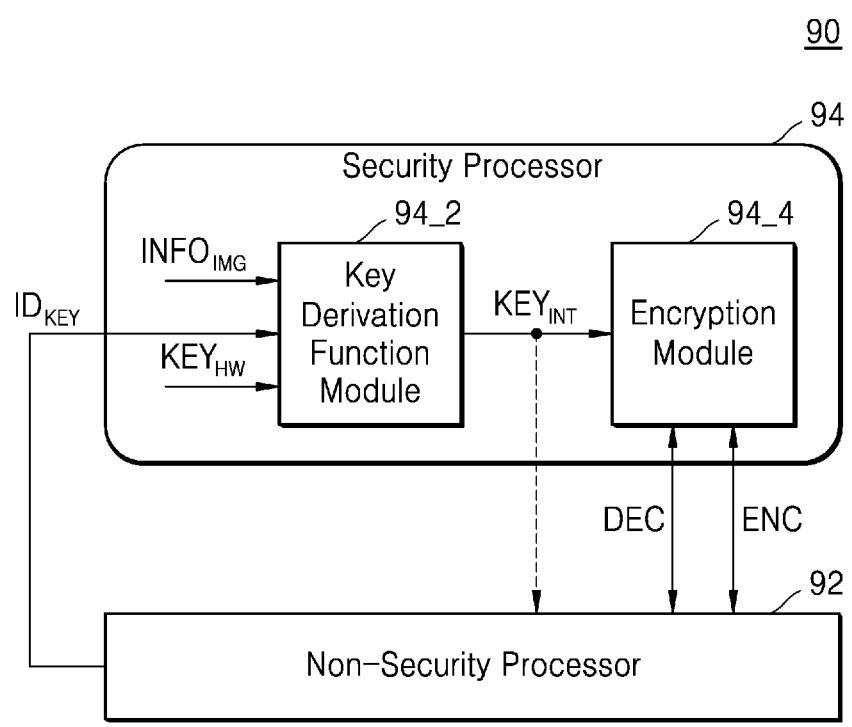
FIG. 9 is a block diagram illustrating an example of an integrated circuit according to an example embodiment.

FIG. 9 is a block diagram illustrating an example of an integrated circuit according to an example embodiment. Specifically, the block diagram of FIG. 9 illustrates an example of an operation, performed by a security processor 94, of generating a key. As shown in FIG. 9, an integrated circuit 90 may include a non-security processor 92 and a security processor 94, and the security processor 94 may include a KDF module 94_2 and an encryption module 94_4.

The KDF module 94_2 may receive image information $INFO_{IMG}$, a key identifier $ID_{KEY}$, and a hardware key $KEY_{HW}$, and may generate an internal key $KEY_{INT}$ that is dependent upon the image information $INFO_{IMG}$, the key identifier $ID_{KEY}$, and the hardware key $KEY_{HW}$. In some embodiments, an internal key is key material not provided outside of the security processor 94. In some embodiments, at least a portion of the KDF module 94_2 may be implemented by at least one core (for example 32_2 in FIG. 3), which is included in the security processor 94, and a series of instructions executed by the at least one core. In addition, in some embodiments, at least a portion of the KDF module 94_2 may be implemented by a hardware accelerator (for example, 32_4 in FIG. 3) included in the security processor 94.

The image information $INFO_{IMG}$ may refer to binding information generated from at least a portion of a program image, which is read from a system memory (for example, 14 in FIG. 1) by the security processor 94. For example, the image information $INFO_{IMG}$ may include a hash for the program image, a digital signature (or a hash thereof) included in the program image, or a verification result of the digital signature. As described above with reference to the above-described figures, the image information $INFO_{IMG}$ may be generated, inside the security processor 94, from the program image directly read by the security processor 94, and thus, may not be exposed outside the security processor 94. Accordingly, key binding that provides improved security may be accomplished.

The key identifier $ID_{KEY}$ may be provided from the non-security processor 92, as shown in FIG. 9. For example, a security program executed by the non-security processor 92 may use a plurality of keys and may identify and manage the plurality of keys by using the key identifier $ID_{KEY}$. The key identifier $ID_{KEY}$ may be transferred from the non-security processor 92 to the security processor 94 through a dedicated physical bus (for example, 12_6 in FIG. 1). In some embodiments, a dedicated physical bus includes a collection of data lines and control lines which are not used by the non-security processor 92 for communication with any other chip or logic. In some embodiments, the key identifier $ID_{KEY}$ may be included in a request for a key, the request being provided from the non-security processor 92 to the security processor 94.

The hardware key $KEY_{HW}$ may have a value unique to the security processor 94 (or the integrated circuit 90) and may be referred to as a root key. The hardware key $KEY_{HW}$ may not be exposed outside the security processor 94. In some embodiments, the security processor 94 may include a one-time-programmable (OTP) memory such as an anti-fuse array, and the hardware key $KEY_{HW}$ may be programmed into the OTP memory when the integrated circuit 90 is manufactured. In some embodiments, the security processor 94 may include a physically unclonable function (PUF) block, and the hardware key $KEY_{HW}$ may be based on an output of the PUF block. The PUF may refer to a function for providing a unique value corresponding to hardware based on intrinsic properties of the hardware. For example, even when a plurality of pieces of hardware such as semiconductor chips are manufactured by the same process, the plurality of pieces of hardware may not be physically completely same with each other, and there may be slight variations, that is, slight process variations, between the plurality of pieces of hardware. Based on these variations, the unique value of the hardware may be extracted, and the extracted value may be used for security-required operations, for example, security communication, security data processing, user identification, a firmware update, and the like. The PUF block may have, but is not limited to, at least one of a SRAM structure that is based on a value stored in a SRAM cell, a ring oscillator structure that is based on frequency variations, a leakage-based structure that is based on leakage current or the like, an arbiter structure in which a path of a signal is arbitrarily determined, and a structure that is based on differences between threshold levels of logic gates.

The encryption module 94_4 may receive the internal key $KEY_{INT}$ from the KDF module 94_2 and may perform encryption and/or decryption based on the internal key $KEY_{INT}$. For example, as shown in FIG. 9, the encryption module 94_4 may receive decrypted data DEC from the non-security processor 92 and may provide encrypted data ENC to the non-security processor 92 by encrypting the decrypted data DEC by using the internal key $KEY_{INT}$. In addition, as shown in FIG. 9, the encryption module 94_4 may receive the encrypted data ENC from the non-security processor 92 and may provide the decrypted data DEC to the non-security processor 92 by decrypting the encrypted data ENC by using the internal key $KEY_{INT}$. Accordingly, the non-security processor 92 may allow the security processor 94 to encrypt security-required data. For example, to maintain security of a data encryption key (DEK) which is generated or used by the non-security processor 92 itself, the non-security processor 92 may provide the DEK to the security processor 94, may receive the DEK encrypted by using the internal key $KEY_{INT}$ from the security processor 94, and may store the encrypted DEK in system storage (for example, 18 in FIG. 1). That is, the non-security processor 92 may receive the encrypted DEK as a key provided by the security processor 94, and the encrypted DEK may also be bound due to the internal key $KEY_{INT}$. In addition, for a security operation based on the DEK, the non-security processor 92 may read the encrypted DEK from the system storage, may provide the encrypted DEK to the security processor 94, and may receive the DEK, which is decrypted by using the internal key $KEY_{INT}$, from the security processor 94. In some embodiments, as denoted by a dashed line in FIG. 9, the internal key $KEY_{INT}$ generated by the KDF module 94_2 may be provided to the non-security processor 92, in response to a request of the non-security processor 92.

Figure 10:
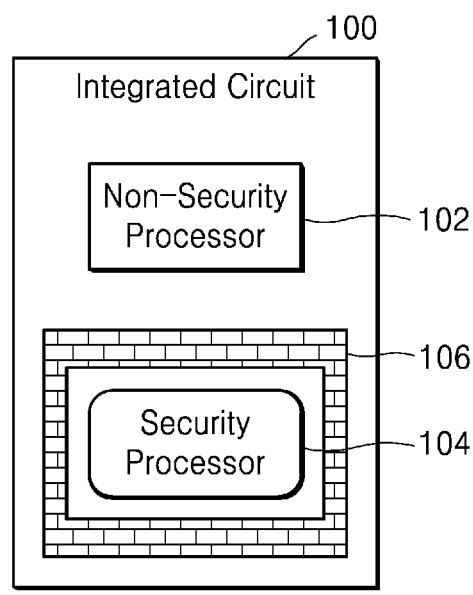
FIG. 10 is a block diagram illustrating an example of an integrated circuit according to an example embodiment.

FIG. 10 is a block diagram illustrating an example of an integrated circuit according to an example embodiment. As shown in FIG. 10, an integrated circuit 100 may include a non-security processor 102 and a security processor 104 and may further include a sensor 106 sensing an attack from outside the integrated circuit 100. In the following descriptions regarding FIG. 10, repeated descriptions given with reference to the above-described figures will be omitted.

The sensor 106 may sense an attack against the security processor 104 from outside the integrated circuit 100. Attackers may make physical attacks against the integrated circuit 100 to extract information from the security processor 104. For example, the attackers may dismantle the integrated circuit 100, may supply power to the dismantled integrated circuit 100, and may attempt to extract information by probing. The integrated circuit 100 may include the sensor 106 to detect such invasive attacks.

The sensor 106 may have any structure for detecting an invasive attack against the security processor 104. In some embodiments, the sensor 106 may include a photosensitive device, for example, a photodiode, and may sense inflow of light caused by the dismantlement of the integrated circuit 100. In addition, in some embodiments, the sensor 106 may include a shield, which includes a plurality of conductive patterns and covers the security processor 104, and may sense changes in characteristics (for example, capacitance or resistance) of the shield or changes in signals passing through the shield, the changes being caused by the dismantlement of the integrated circuit 100. In some embodiments, unlike the example shown in FIG. 10, the sensor 106 may also detect an invasive attack against the non-security processor 102 as well as against the security processor 104. Examples of an operation performed in response to an attack sensed by the sensor 106 will be described below with reference to FIG. 11.

Figure 11:
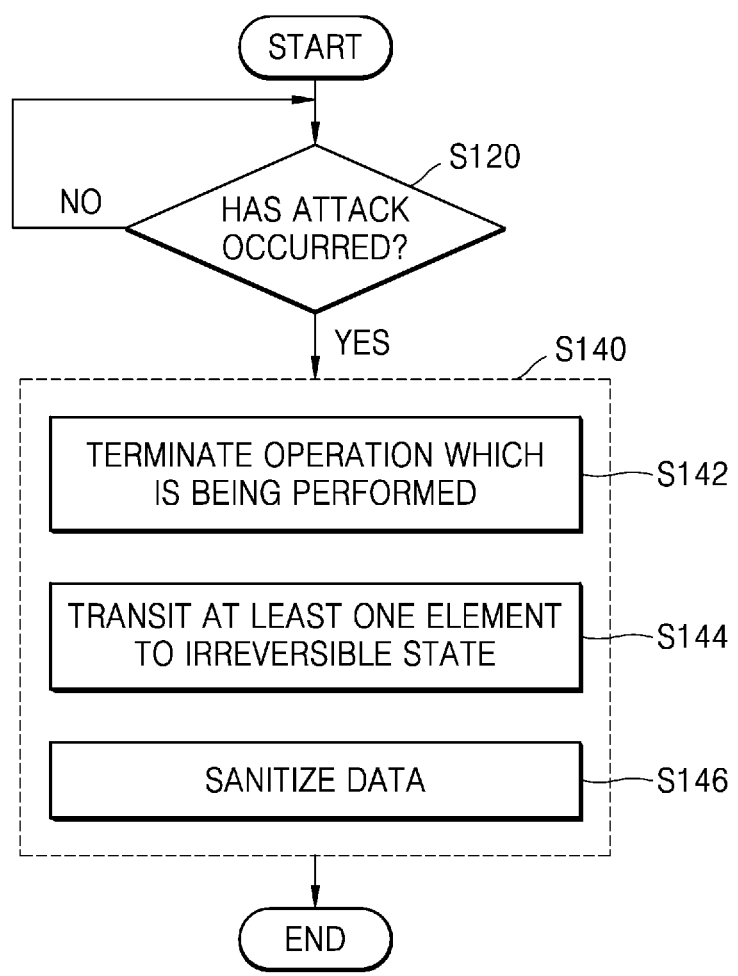
FIG. 11 is a flowchart illustrating an example of a method of securely managing a key, according to an example embodiment.

FIG. 11 is a flowchart illustrating an example of a method of securely managing a key, according to an example embodiment. Specifically, the flowchart of FIG. 11 illustrates an example of an operation performed by the security processor 104 when an invasive attack against the security processor 104 is sensed by the sensor 106 of FIG. 10. The following descriptions regarding FIG. 11 will be made with reference to FIG. 10.

In operation S120, it may be determined whether an attack occurs. For example, the security processor 104 may receive an output signal of the sensor 106 and may determine the occurrence or not of an attack, based on the output signal. As shown in FIG. 11, when an attack occurs, an operation for protection from the attack may be performed in operation S140. Operation S140 may include a plurality of operations S142, S144, and S146, as shown in FIG. 11, in some embodiments, and may also include only some of the plurality of operations S142, S144, and S146, unlike the example shown in FIG. 11, in some embodiments. In some embodiments, at least two of the plurality of operations S142, S144, and S146 may be performed in parallel. It should be noted that an operation performed by the security processor 104 in response to the occurrence of an attack is not limited to the examples in FIG. 11.

In operation S142, an operation that is being performed may be terminated. For example, the security processor 104 may terminate such an operation of securely managing a key as described with reference to the above-described figures, whereby an estimation of an operation of the security processor 104 by probing may be prevented. In operation S144, an operation of transiting at least one element to an irreversible state may be performed. For example, the security processor 104 may make a fine pattern open-circuited by applying a strong electrical signal to the fine pattern and may block a signal from being transferred via the open-circuited pattern. In addition, the security processor 104 may transit a cell, which is not programmed in an OTP memory, to an irreversible state by programming the cell. In operation S146, an operation of sanitizing data may be performed. For example, the security processor 104 may sanitize data by overwriting any data (for example, all-zero data) to an internal memory (for example, 32_5 in FIG. 3) and/or a secure memory (for example, 36 in FIG. 3).

FIG. 12 is a block diagram illustrating an example of a system according to an example embodiment. As shown in FIG. 12, a system 120 may include a system-on-chip 122, DRAM 124, storage 128, and a secure non-volatile memory 126. In the system 120 of FIG. 12, the DRAM 124 may function as a system memory, and the storage 128 may function as system storage. In the following descriptions regarding FIG. 12, repeated descriptions given with reference to FIG. 1 will be omitted.

The system-on-chip 122 may refer to an integrated circuit, which is manufactured by a semiconductor process, and into which various hardware blocks are integrated. As shown in FIG. 12, the system-on-chip 122 may include at least one core 122_1, ROM 122_2, peripherals 12_3, a DRAM access controller 122_4, a storage controller 122_6, and a security processor 122_7. The non-security processor described above with reference to the figures may include the at least one core 122_1 and, in some embodiments, may further include other components except for the security processor 122_7. In some embodiments, the system-on-chip 122 may further include a bus to which the least one core 122_1, the ROM 122_2, the peripherals 12_3, the DRAM access controller 122_4, and the storage controller 122_6 are connected. Not all bus connections are shown in FIG. 12.

The at least one core 122_1 may execute instructions stored in the ROM 122_2 and/or instructions stored in the DRAM 124. For example, the at least one core 122_1 may include a cache, may copy the instructions included in the ROM 122_2 and/or the DRAM 124 to the cache, and may execute the instructions stored in the cache. In some embodiments, the at least one core 122_1 may include a plurality of cores that are symmetric or asymmetric.

The ROM 122_2 may store the instructions executed by the at least one core 122_1. For example, the ROM 122_2 may store a bootloader, and the at least one core 122_1 may execute, first, the instructions, that is, the bootloader, stored in the ROM 122_2, when an initialization process of the system 120 is started. For this purpose, in some embodiments, at least a portion of the bootloader may be loaded into the DRAM 124. In addition, in some embodiments, the ROM 122_2 may further store immutable data, which is referenced by the at least one core 122_1 when the at least one core 122_1 executes the instructions, in addition to storing the instructions.

The peripherals 122_3 may include hardware blocks having various functions. For example, the peripherals 122_3 may include an input/output (I/O) interface block providing a communication channel for communication with a device external to the system-on-chip 122 and may also include a hardware accelerator designed to perform an operation such as data encoding/decoding or the like at a high speed.

The DRAM access controller 122_4 may control access to the DRAM 124 via a DRAM controller 122_5. For example, the DRAM 124 as a system memory may be divided into a security region and a non-security region, and the DRAM access controller 122_4 may limit access to the security region of the DRAM 124. In some embodiments, the security processor 122_7 may lock access to a program image by other components of the system-on-chip 122, via the DRAM access controller 122_4, during reading of at least a portion of the program image stored in the DRAM 124 for key generation, and the security processor 122_7 may unlock the access to the program image, via the DRAM access controller 122_4, after completion of the reading of at least a portion of the program image.

The DRAM controller 122_5 may provide an interface for accessing the DRAM 124. In addition, the storage controller 122_6 may provide an interface for accessing the storage 128. For example, the storage 128 may include a flash memory device, and the storage controller 122_6 may provide an interface of flash memory.

The security processor 122_7 may communicate with a non-security processor, for example, the at least one core 122_1, through a dedicated physical bus and, for this purpose, may include at least one register (for example, 32_1 in FIG. 3). In addition, the security processor 122_7 may exclusively access the secure non-volatile memory 126 and, for this purpose, may include a non-volatile memory controller (for example, 32_6 in FIG. 3). The security processor 122_7 may directly read at least a portion of a program image stored in the DRAM 124 via the DRAM controller 122_5 and may generate binding information based on the at least the read portion of the program image. The security processor 122_7 may generate a key based on the binding information generated inside thereof, and thus, exposure of the binding information used for key generation may be prevented.

While embodiments have been particularly shown and described with reference to embodiments herein, it will be understood that various changes in form and details may be made therein without departing from the spirit and scope of the following claims.

What is claimed is:

1. An integrated circuit comprising:
 a first processor configured to execute a first program image to perform a security operation, the first program image being stored in a system memory;
 a second processor configured to:
  read at least a portion of a second program image, the second program image being stored in the system memory, and
  generate a key based on the at least the portion of the second program image; and
 a dedicated communication channel for communication between the first processor and the second processor,
 wherein the first processor is further configured to:
  receive the key through the dedicated communication channel, and
  perform the security operation based on the key, wherein the security operation includes performing an encryption using the key or performing a decryption using the key.

2. The integrated circuit of claim 1, wherein the second processor is further configured to:
 generate a hash for the at least the portion of the second program image, and
 generate the key based on the hash.

3. The integrated circuit of claim 1, wherein the at least the portion of the second program image comprises a digital signature, and
 the second processor is further configured to generate the key based on the digital signature.

4. The integrated circuit of claim 3, wherein the second processor is further configured to:
 verify the digital signature based on verification information for verifying the digital signature, and
 generate the key based on a result of the verification.

5. The integrated circuit of claim 4, wherein the second processor is further configured to obtain the verification information from at least one of an exclusively accessible non-volatile memory or a program image executed by the second processor.

6. The integrated circuit of claim 1, wherein the first processor, the second processor, and the system memory are configured such that access to the second program image by the first processor is blocked while the second processor reads the at least the portion of the second program image.

7. The integrated circuit of claim 1, wherein the second processor is further configured to generate the key in response to a request from the first processor, and
 the first processor is further configured to transfer the request from the first processor to the second processor through the dedicated communication channel.

8. The integrated circuit of claim 7, wherein the request comprises an identifier of the second program image, and
 the second processor is further configured to:
  obtain, based on the identifier of the second program image, loading information of the second program image from an exclusively accessible non-volatile memory, and
  read, based on the loading information, the at least the portion of the second program image from the system memory.

9. The integrated circuit of claim 7, wherein the request comprises a key identifier, and
 the second processor is further configured to generate the key based on the key identifier.

10. The integrated circuit of claim 1, wherein the first processor is further configured to provide data to the second processor through the dedicated communication channel, and
 the second processor is further configured to:
  generate an internal key based on the at least the portion of the second program image, and
  generate the key by decrypting or encrypting the data based on the internal key.

11. The integrated circuit of claim 1, wherein the first program image is the same as the second program image.

12. The integrated circuit of claim 1, wherein the second processor is further configured to:
 receive an identifier and loading information of the second program image from the first processor through the dedicated communication channel, and
 write the identifier and the loading information to an exclusively accessible non-volatile memory.

13. The integrated circuit of claim 1, wherein the second processor is further configured to:
 obtain a hardware key from inside the second processor, and
 generate the key based on the hardware key.

14. The integrated circuit of claim 1, wherein the second processor comprises a direct memory access (DMA) controller configured to read the at least the portion of the second program image from the system memory.

15. The integrated circuit of claim 1, further comprising a sensor configured to sense a physical attack against the second processor.

16. A system comprising:
 an integrated circuit comprising a first processor and a second processor, wherein the first processor and the second processor are configured to communicate with each other through a dedicated communication channel;
 a system memory configured to store a program image, the program image being executable by the first processor; and
 a non-volatile memory configured to be exclusively accessible by the second processor and to store loading information of the program image,
 wherein the second processor is further configured to:
  read, based on the loading information, at least a portion of the program image from the system memory;
  generate a key based on the at least the portion of the program image, and
  provide the key to the first processor, and
 the first processor is further configured to perform a security operation based on the key, wherein the security operation includes performing an encryption using the key or performing a decryption using the key.

17. The system of claim 16, wherein the at least the portion of the program image comprises a digital signature, and
 the second processor is further configured to generate the key based on the digital signature.

18. The system of claim 17, wherein the non-volatile memory is further configured to store verification information for verifying the digital signature, and
 the second processor is further configured to:
  verify the digital signature based on the verification information, and
  generate the key based on a result of the verification.

19. The system of claim 16, wherein the second processor is further configured to write the loading information to the non-volatile memory, in response to at least one of initial setting in the system during a manufacturing process of the system, a master reset of the system, and installation, by the first processor, of an application corresponding to the program image onto an operating system.

20. A method performed by an integrated circuit comprising a first processor and a second processor, the method comprising:
- reading, by the second processor, at least a portion of a program image from a system memory, the program image being executable by the first processor;
- generating, by the second processor, a key based on the at least the portion of the program image; and
- performing, by the first processor, a security operation based on the key, wherein the security operation includes performing an encryption using the key or performing a decryption using the key.

21. The integrated circuit of claim 1, wherein each of the first program image and the second program image includes a series of instructions executable by the first processor.

22. The integrated circuit of claim 1, wherein the first program image is not the same as the second program image.

23. The integrated circuit of claim 4, wherein the verification information is a public key, the result of the verification is a decrypted digital signature obtained using the public key, and the second processor is further configured to generate the key using the result of the verification as keying material as an input to a key derivation function.

24. The integrated circuit of claim 1, wherein the second processor is further configured to:
- compute a cryptographic algorithm result over the at least the portion of the second program image, and
- generate the key based on the at least the portion of the second program image by using the cryptographic algorithm result as a keying material input to a key derivation function.

* * * * *